United States Patent
Jensen et al.

(10) Patent No.: US 7,309,436 B2
(45) Date of Patent: Dec. 18, 2007

(54) PROCESS FOR REMOVING PERCHLORATE IONS FROM WATER STREAMS

(75) Inventors: Peter L. Jensen, San Diego, CA (US); Bryan Zinn, Monrovia, CA (US); John Zitlau, Upland, CA (US)

(73) Assignee: Basin Water, Inc., Rancho Cucamonga, CA (US)

( * ) Notice: Subject to any disclaimer, the term of this patent is extended or adjusted under 35 U.S.C. 154(b) by 0 days.

(21) Appl. No.: 11/219,335

(22) Filed: Sep. 1, 2005

(65) Prior Publication Data

US 2006/0144780 A1 Jul. 6, 2006

Related U.S. Application Data

(60) Provisional application No. 60/606,655, filed on Sep. 1, 2004.

(51) Int. Cl.
*B01D 15/00* (2006.01)
*B01D 24/00* (2006.01)

(52) U.S. Cl. ............... 210/662; 210/669; 210/683; 210/284

(58) Field of Classification Search ............... 210/662, 210/669, 683, 284
See application file for complete search history.

(56) References Cited

U.S. PATENT DOCUMENTS

| 6,066,257 A | 5/2000 | Venkatesh et al. |
|---|---|---|
| 6,398,965 B1 | 6/2002 | Arba et al. |
| 2002/0117431 A1 | 8/2002 | Jensen et al. |

OTHER PUBLICATIONS

International Search Report, PCT/US05/32260, dated Jul. 17, 2006.

*Primary Examiner*—Chester T. Barry
(74) *Attorney, Agent, or Firm*—Foley and Lardner LLP

(57) ABSTRACT

Methods and systems for removing perchlorate from water are disclosed which involve the use of a plurality of vessels containing an ion exchange resin having affinity for perchlorate ions, and in which perchlorate-contaminated water is passed over the resin in some but not all of the plurality of vessels operating in parallel to one another thereby removing perchlorate ion from the water stream and generating reduced perchlorate content product water streams and in which a subset of the plurality of vessels is removed from service, their resin is removed and replaced and they are returned to service.

17 Claims, 4 Drawing Sheets

PROCESS FOR REMOVING PERCHLORATE IONS FROM WATER STREAMS

CROSS REFERENCE TO THE RELATED APPLICATION

This application claims the benefit under 35 USC 119(e) of U.S. patent application No. 60/606,655 filed on Sep. 1, 2004.

FIELD OF THE INVENTION

This invention pertains to water treatment. More particularly, it pertains to an ion exchange process for removing perchlorate ions from water streams including drinking water streams, ground water and other potable water steams and brines.

BACKGROUND OF THE INVENTION

The issue of perchlorate ion contamination of ground water has become a national concern. Perchlorate is a component of certain explosives and has been widely used as an oxidant in solid phase rocket fuels. With each such explosive discharge and each such solid fuel rocket launch amounts of unexpended perchlorate are released into the atmosphere. This perchlorate is extremely water soluble and thus readily enters the ground water. Facilities preparing these explosives and rocket fuels have also been significant sources of perchlorate release. The California Department of Health Services has set an action level for perchlorate ion in drinking water 18 ug/L, based upon the potential for perchlorate to inhibit the uptake of iodine by the thyroid gland.

This perchlorate-contamination problem is a relatively recently identified one and as such a number of competing technologies are under development to solve it.

One approach involves passing the contaminated stream through a bioreactor containing organisms capable of reducing perchlorate to chloride. Another involves the use of ion exchange to remove perchlorate. We have studied the latter approach and have found, as have others, that many ion exchange resins such as common polystyrene/SBA resins have a very high affinity for perchlorate ions. This high affinity, while attractive from the point of view of removing perchlorate from water flows, leads to the problem that it is very difficult to desorb the tightly bound perchlorate from the resin using conventional regeneration techniques such as treatment with concentrated brine. In fact, the amount of sodium chloride needed to regenerate a perchlorate-loaded ion exchange resin can be as much as several hundred pounds per cubic foot of resin. The second regeneration problem is that the spent regeneration brine itself becomes heavily contaminated with perchlorate and the idea of pumping this perchlorate-loaded brine down a disposal well is unattractive in view of the fact that the perchlorate load is likely to eventually reappear in the ground water.

This has led to processes in which the perchlorate ion load in the drinking water stream is adsorbed by ion exchange resin to saturation, the loaded resin is removed and disposed of, such as by burial as hazardous waste or incinerated to destroy its perchlorate content. These disposable resin perchlorate removal processes often function with pairs of beds operated in a "lead-lag" method. In a lead-lag process, the water stream is passed through two resin beds, in series, the first of the two resin beds, the "lead" bed, having a very high affinity for perchlorate, will initially remove virtually all of the perchlorate present in the water stream. The second bed in the series, the "lag" bed will have "nothing to do" during the initial stages of operation as the lead bed is doing such a good job of removing perchlorate. As time passes, the lead bed becomes loaded with perchlorate and gradually begins to loose effectiveness and begins to permit increasing levels of perchlorate to "break through". Fortunately, in this process, the lag bed is still fresh and it removes any perchlorate passing through the lead bed. This can continue for a period as the lead bed's capacity becomes essentially completely used up. At this point, the lead bed is taken out of service and a new "fresh" bed is introduced, in this case in series with the former "lag" bed which has now moved to a "lead" position.

In a commercial scale water treatment unit, there will typically be two or three "lead-lag" pairs of vessels, all of large (multi-thousand gallon) size and each capable of handling many hundreds of gallons of water flow per minute. This large size leads to the necessity of very substantial permanent installations with heavy foundations and the like. It also leads to the necessity of physically removing the large quantities of hazardous perchlorate-laden disposable resin from the large, permanently mounted vessels at the water treatment site.

We have pioneered the concept of using large numbers of small vessels containing small resin beds in combination with computer control in water treatment settings. We have applied this technology to the removal of nitrate, arsenate and perchlorate from drinking water, as used heretofore, we have operated these facilities under computer control to optimize the removal of ions from water supplies and especially to efficiently regenerate and rinse the resin beds.

STATEMENT OF THE INVENTION

We have now surprisingly discovered that the use of a large number of small resin bed offers unexpected advantages when applied to the simple process of removing perchlorate ions from water supplies using disposable ion exchange resins.

Thus, in one embodiment this invention provides a method for removing perchlorate ion contamination from a perchlorate-ion-contaminated water stream. This method involves:

a. Obtaining a plurality of at least about 6 vessels each substantially filled with an ion exchange resin having affinity for perchlorate ions, b. Feeding the perchlorate-contaminated water over a substantial proportion but not all of the plurality of vessels. This substantial proportion of vessels is operated in parallel to one another thereby removing perchlorate ion from the water stream and generating a plurality of [parallel reduced perchlorate content product water streams. This also loads the resin beds in the substantial proportion of the plurality of vessels with perchlorate ions.

c. Periodically removing from service a subset of the substantial proportion of the plurality of vessels containing resin that has been loaded with perchlorate in step b and replacing this subset with a similar subset of vessels taken from those vessels not employed in step b.

d. Replacing the vessels removed from service in step c in the plurality of vessels with a substantially equivalent number of equivalent vessels having fresh ion exchange resin or replacing the ion exchange resin in the vessels removed from service in step c with fresh resin and returning the vessels with the replaced resin into the plurality of vessels.

e. Thereafter continuing step b while periodically repeating steps c and d at least until all of the substantial plurality of vessels have been removed and replaced.

In this method the periodic removal from service of vessels may be carried out on a predetermined schedule or may be based upon the results of monitoring the effluent from the various vessels.

In this method the plurality of vessels is from about 6 vessels to about 100 vessels and preferably from about 10 to about 30 vessels. It is also preferred that the substantial proportion of the plurality of vessels is such that no single vessel is being fed more than about 20% or the total amount of perchlorate contaminated water.

In this method the spent resin in a vessel can be replaced in situ or the vessel itself can be changed out to one containing fresh resin. In most cases the resin taken out of service is disposed of such as by incineration or by burial as toxic waste A feature of this invention is that the effluents from the substantial number of vessels treating water are pooled.

This method and system can include a polishing bed that treats the combined effluent product water. It can also include a prefilter or other pretreatment step to remove materials which might contaminate or foul the resin.

This method can be used to treat perchlorate-contaminated ground water and other drinking waters. It also can be used to remove perchlorate out of perchlorate-laden brines, because of the high affinity of resins for perchlorate.

In other aspects this invention provides systems for carrying out the invention as well as purified water produced using the system.

Description of the Invention

BRIEF DESCRIPTION OF THE DRAWINGS

This invention will be further described with reference being made to the accompanying drawings in which.

DESCRIPTION OF PREFERRED EMBODIMENTS

Perchlorate Removal by Ion Exchange Resin

Figure 1:
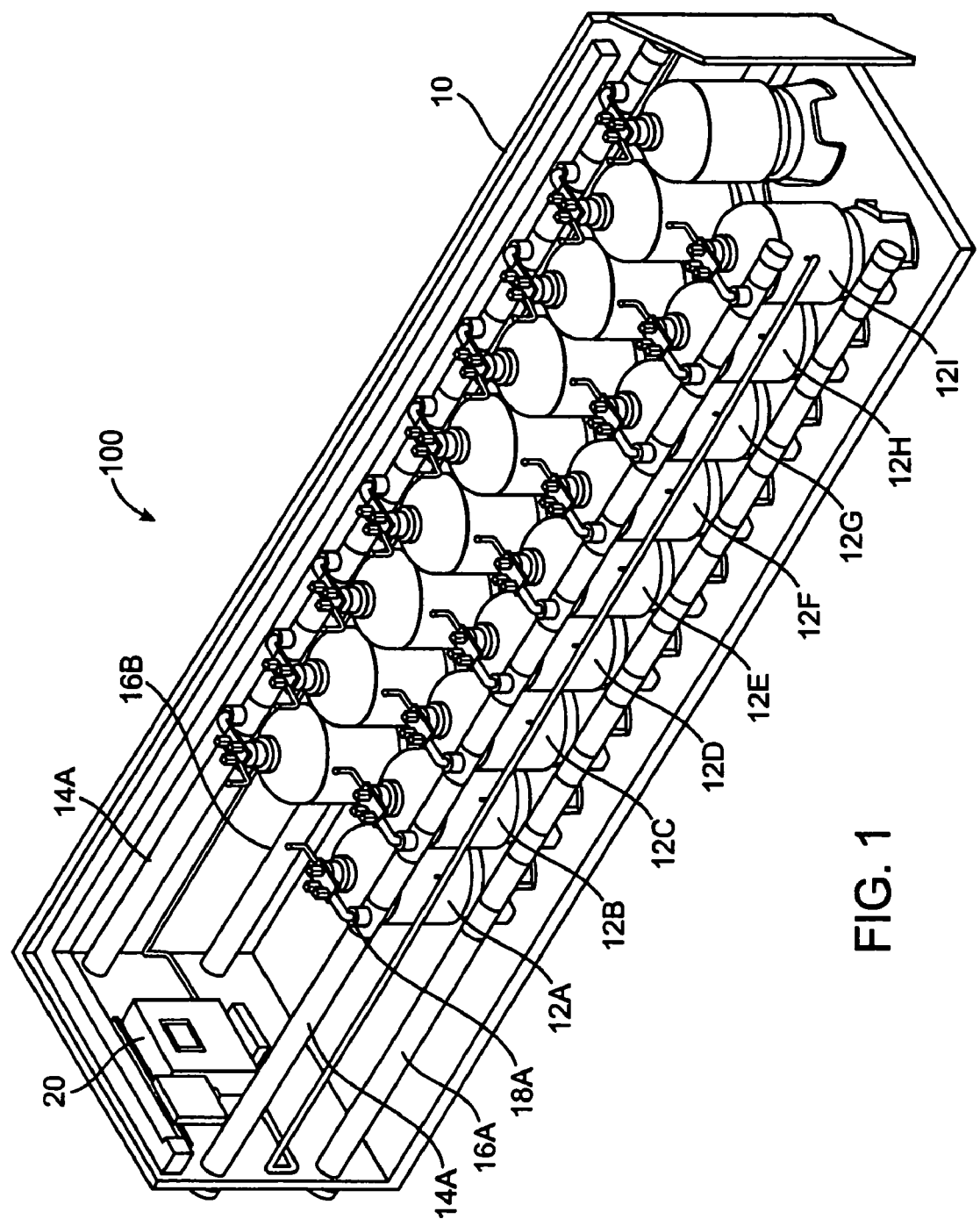
FIG. 1 is a partially schematic perspective view of a plurality of ion exchange resin beds useful in the practice of the present invention.

In order to understand the operation of the process of the present invention it is important to understand the basic elements of the ion exchange treatment process. Each of the plurality of ion exchange beds are filled with ion exchange resin. For efficiency it is desirable to fill the beds substantially completely full, that is at least about 50% by volume full and more commonly at least about 75% full and preferably at least about 85% or even at least 90% full.

The ion exchange resin is in the form of small beads usually based on a polymer such as cross-linked polystyrene which are specially treated by the resin manufacturer to give them their very unique ion exchange properties. The beads are delivered with numerous chloride ions attached to the beads.

The ion exchange resins which are presently preferred for use in the process of the invention are strong base resins. These resins are based on various polymer structures such as polystyrene with cross-linkers and with appropriate active groups such as quaternary ammonium attached:

Resintech SIR 100 HP, SBG1, SBG1P and SBG2

Prolate Strong Base Resins Type 1 and Type 2

Amberlite IRA-400

Amberlite IRA-900

Dowex SBR

Ionac ASB-1

Ionac AFP-100

Dowex SBR-P

Dowex 11

Duolite A-102-D

Ionac ASB-2

Amberlite IRA-93

Amberlite IR-45

Purolite A-400

Purolite A-600

Ionac A-260

Dowex WGR

Sybron SR6

Sybron SR7

Reillex™ Resins (based on polyvinyl pyridene polymers)

Nitrex

Generally, the strong base type I resins, particularly those based on polystyrene backbones, give good overall results removing perchlorate and are preferred.

When a resin bead is exposed to water with low concentrations of contaminant ions, such as well water, the beads will exchange the chloride ions on the bead for contaminant ions in the well water. This effectively causes the contaminant ions to be removed from any water flowing over the resin. This will continue until the supply of chloride ions on the bead is depleted.

The ion exchange resins employed in the present invention, while in some cases having some degree of selectivity for one or more particular anions in water, in general have affinity for relatively benign anions commonly found in water such as bicarbonate and sulfate as well as undesirable contaminants such as nitrate and perchlorate. The quantities of these other anions greatly dwarf the quantities of perchlorate. For example typical feed water supplies treatable for chlorate removal by the present invention will commonly contain influent concentrations of bicarbonate of 50-1000 and commonly 100 to 500 mg/L; nitrate 5 to 200 and commonly 10 to 50 mg/L; sulfate 25-500 and commonly 40 to 250 mg/L in addition to the actionable (greater than 4 ug/L and most commonly 4-50 and especially 4-35 ug/L0 levels of perchlorate.

As this raw water flows through the beds, the ion exchange resin strips anions out of the water by exchanging chloride ions on the resin beads for these contaminant ions in the water. This might suggest that he nonperchlorate anions would use up the resin capacity and prevent the resin from absorbing more than a negligible amount of perchlorate. This is incorrect as it fails to take into account the fact that perchlorate is the very most tightly bound common contaminant anion. The resin's affinity for perchlorate is so great that perchlorate will displace a substantial proportion of the bicarbonate, sulfate and/or nitrate anions that may initially load the resin.

Figure 2:
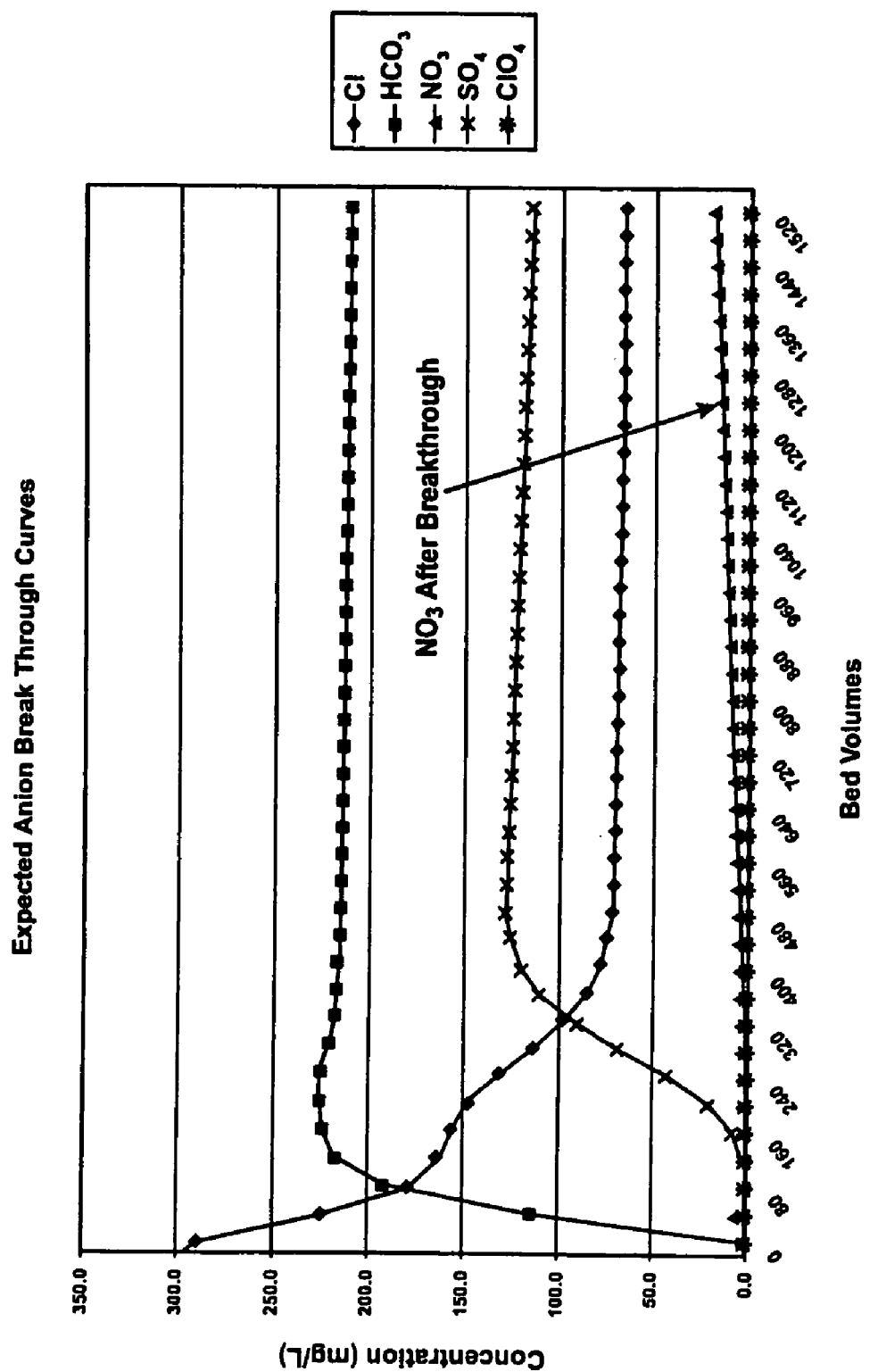
FIG. 2 is a graph depicting a series of anion breakthrough curves for perchlorate and the other contaminant anions which commonly accompany perchlorate in water supplies. It shows characteristic curves from 0 to 1520 bed volumes absorbed. This simulated data is based on influent concentrations of bicarbonate of 214.7 mg/L; nitrate 20.5 mg/L; sulfate 117.1 mg/L and perchlorate 8.96 ug/L.
Figure 3:
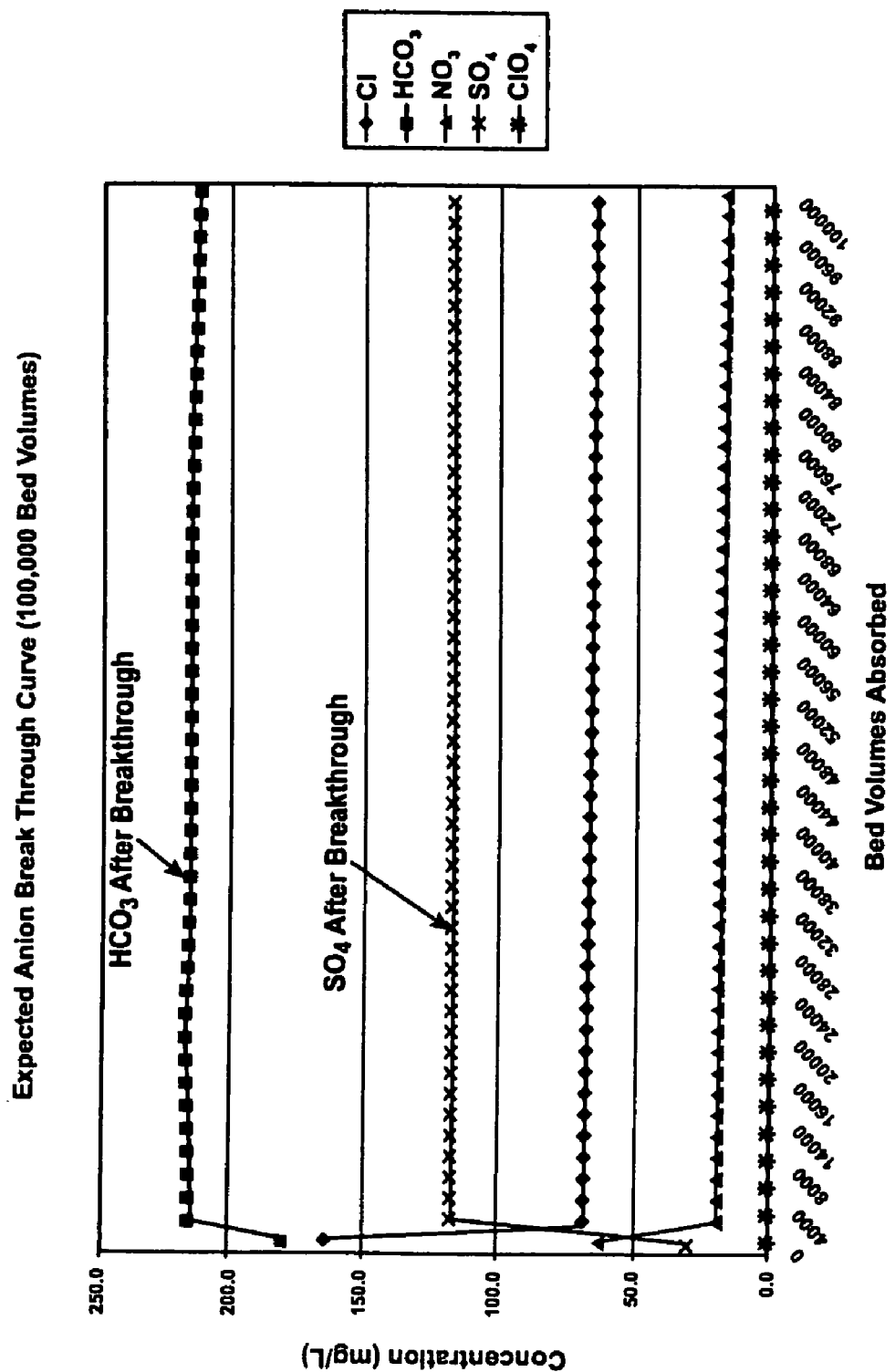
FIG. 3 is a graph depicting a series of anion breakthrough curves for perchlorate and the other contaminant anions which commonly accompany perchlorate in water supplies. It shows characteristic curves from 0 to 100,000 bed volumes absorbed. This simulated data is based on influent concentrations of bicarbonate of 214.7 mg/L; nitrate 20.5 mg/L; sulfate 117.1 mg/L and perchlorate 8.96 ug/L.

In fact, we have observed that the concentration of any of these anions in the effluent of a single ion exchange bed exhibits very predictable and repeatable behavior. FIG. 2 is the predicted breakthrough curved for these various anions during the life of the resin for any given single bed. FIG. 3 below shows the breakthrough curves for the various anions during the first 1520 bed volumes absorbed by the resin for any single bed. Notice that for the bicarbonate, sulfate and nitrate ions "break through", that is reappear in the effluent as the result of resin saturation, very early in the run until their concentration equals the influent anion concentration. The curve representing the plot of bed effluent anion concentration for a bed is referred to as the "Breakthrough Curve". When analyzed from a gallons treated standpoint, the point at which breakthrough will occur is a function of various raw water anion concentrations, the amount of ion exchange resin in the bed, and the number of chloride ions on the resin available for exchanging. In this system, the amount of ion exchange resin is fixed in each bed. The number of chloride ions available for exchanging is fixed by the resin supplier.

Figure 4:
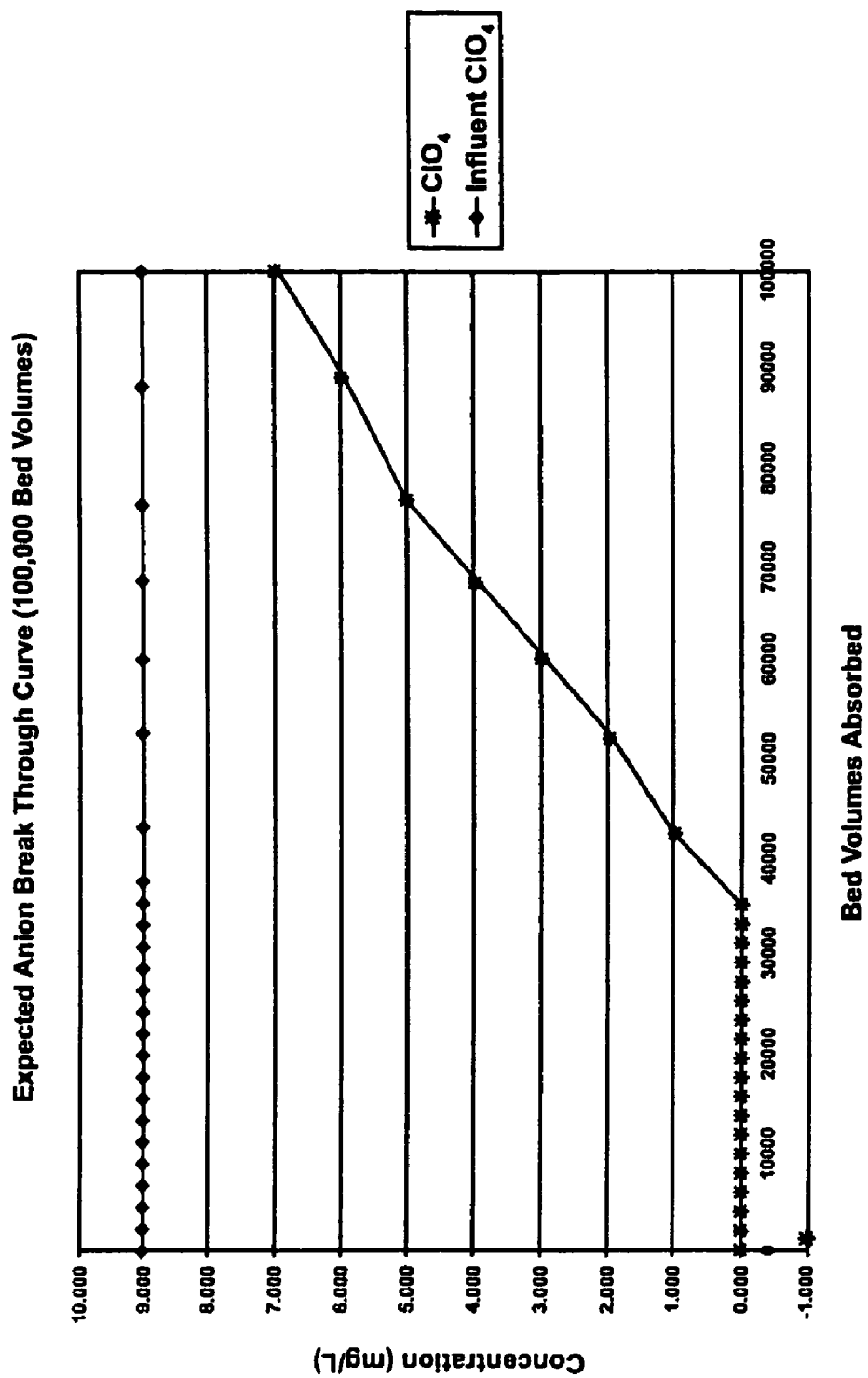
FIG. 4 is a graph depicting in more detail the breakthrough curve for perchlorate in water supplies. It shows a characteristic curve from 0 to 100,000 bed volumes absorbed. This simulated data is based on influent concentrations of bicarbonate of 214.7 mg/L; nitrate 20.5 mg/L; sulfate 117.1 mg/L and perchlorate 8.96 ug/L.

The break through point for perchlorate occurs long after the breakthrough has occurred for nitrate. Therefore nitrates will only be removed in the initial stages of the bed life. FIGS. 2 and 3 above show the predicted behavior of the various anions. Notice that all of these anions with the exception of perchlorate will break through during the first 500 bed volumes. Also notice the anions do not increase any higher than the influent concentrations. FIG. 4 shows the same data as FIG. 3 for perchlorate but at a more refined scale. Notice how long it takes for the concentration of perchlorate to increase. Note that FIGS. 2, 3, and 4 are graphs of the effluent concentration of a single bed.

Multiple Small Bed Design Concept:

As opposed to classical ion exchange plants, the present invention uses multiple small ion exchange beds operating in parallel to generate treated water. The ion exchange systems of this invention employ a substantial plurality of treatment vessels. FIG. 1 depicts one physical arrangement of the multiple vessels in the system 100 of this invention showing eighteen vessels 12A, 12B, etc in two rows of nine vessels each. A piping gallery including inlet lines 14A and 14B and outlet lines 16A and 16B can address each of the vessels in the two rows to permit various combinations of the eighteen. Each of the vessels has an intake valve 18A, etc which can control the flow of feed water into the individual vessels when open and remove the vessel from service when closed. A different configuration could consist of one row of eighteen vessels, three rows of six vessels, or the like with directly adjacent manifold galleries. The number of vessels can vary from about ten to about one hundred vessels but typically from about ten to about thirty vessels and particularly ten to twenty-five vessels. In the embodiment shown in FIG. 1 the vessels are shown in a trailer 10 or other container, a set up facilitated by the general small size of the individual vessels. This is wholly optional and if desired, the size of the multiple vessels could be increased to the multiple thousands of gallon size.

The flow rate of water through the vessels can play a part in determining the efficiency of the system. Obviously, a very low flow rate would lead to a very low throughput for the system. Conversely, a very high flow rate could lead to inadequate treatment or inadequate regeneration or rinsing. On a commercial scale, the resin beds are from about two feet to about six feet in depth (length). Good results are achieved with such beds if the flow rate of liquid over the resin bed, either upflow or downflow, is from about six gallons per minute per square foot of resin bed area ($gpmft^2$) to about sixteen $gpmft^2$. Flow rates of eight to fourteen and especially about $gpmft^2$ good results flowing contaminated water over the resin beds for treatment.

This multibed configuration has many advantages over more traditional large fixed bed designs, which utilize a low number of very large capacity beds. The key advantage to the configuration is that the higher number of beds minimizes the impact of an individual bed's effluent water chemistry on the overall plant effluent water chemistry. The effluent water quality is more consistent since it is always the average of multiple beds which are each operating at different, evenly staggered points on their breakthrough curves. During normal operations with for example a series of 36" diameter vessels, each vessel can treat up to 85 gpm. For an 800-gpm unit, at least 10 beds will be online treating water at any given time. The overall water quality will be the flow weighted average of all online beds. With this in mind, the total concentration in the effluent of a contaminant ($C_E$) would be determined using the following relation:

$$C_E = [C_1(Q_1) + C_2(Q_2) + + C_3(Q_3) + \ldots + C_n(Qn)] / [Q_{total}]$$

Where:

N=Total number of beds online $C_E$=Total effluent concentration of contaminant ion $C_X$=Total effluent concentration of contaminant ion at bed X, where X is the designated bed number.

$Q_X$=Total flow through bed X.

$Q_{total}$=Total flow through all beds

Piping design can ensure even flow distribution between all vessels. However as can be seen in the relation above, minor flow variations in each vessel will have very little influence on the total effluent water quality. Likewise, variations in effluent water quality from individual beds also have relatively little influence on the total effluent water quality.

Beds are intentionally sequenced such that each bed is operating at different, equally staggered points along their respective breakthrough curves; the influence of pH changes in individual bed effluent on total effluent pH is greatly mitigated, if not completely eliminated. This is true because the effluent of any bed experiencing a pH or any other water quality transient condition is always combined and diluted with the effluent of nine other beds. The staggered bed operation also allows the beds to run far into their breakthrough curves. Although one bed may be at the end of its absorption capacity where anion concentrations are higher than the overall treatment goal that beds effluent is combined with many other beds, which are still producing low anion concentrations.

As an ion exchange bed with fresh resin comes back online, there will generally be some pH transients in the bed's effluent water as the bed progresses along its breakthrough curve. This phenomenon is particularly evident if there is bicarbonate in the raw water. In traditional large fixed bed ion exchange plants this can be a problem since the bed effluent is not diluted with other treated water streams of acceptable pH levels.

DESCRIPTION OF AN ILLUSTRATIVE EMBODIMENT

The following is a description of a particular embodiment of the invention. It provides details regarding sizing and flow rates and the like which are specific to this particular embodiment. It will be appreciated that this unit could be resized without departing from the spirit of this invention.

This embodiment describes the removal of perchlorate ion contamination from well water. It contains predicted efficiency and performance characteristics based upon a representative perchlorate-contaminated water flow.

The unit incorporates the following key features and design concepts:

The material used for perchlorate removal is an ion exchange resin that is most typically NSF approved for drinking water use. It is non-toxic, insoluble, and chemically and biologically stable. Multiple (e.g. 10-20) relatively small size ion exchange vessels operating in parallel accomplish perchlorate removal. Ion exchange vessels (also called "beds") are staged such that each in service bed is at a different point on its breakthrough curve. Ion exchange vessels are operated in a packed bed mode. Ion exchange vessels operate at a rate of approximately 12.5 of media surface. A programmable logic controller controls the equipment. A panel mounted touch screen PC provides operator interface for process monitoring and controls as well as data logging functions.

The ion exchange vessels, also referred to as "beds" are 36" diameter fiberglass vessels. The ion exchange resin in the beds removes contaminants from the water being treated by exchanging chloride ions with the perchlorate ions. Each bed is equipped with two valves that allow the control system to cycle each bed into and out of absorption cycle.

A well pump moves raw groundwater to the unit for treatment and then into the distribution system. A feed water prefilter system consists of multiple bag filter units, each rated at 100 gpm. Inside of each bag filter is a disposable 5 micron filter element. The filter bags are used to remove particulate matter in the well water prior to entry into the ion exchange unit. This protects the beds from fouling by particulate matter.

Raw water is pumped from the groundwater well directly into the profiler and then to the ion exchange unit. The operator specifies the number of in service beds to match the desired treated water production rate. Actual flow through the unit is dictated by the raw water feed rate (well yield). Ideally beds should be selected so that each bed sees approximately 85 gpm of treated water; however the beds may be operated at higher or lower flow rates if The maximum number of in service beds is the total number of beds available for automatic operation minus "n", where "n" is the total number of beds offline waiting for resin disposal or for reintroduction into perchlorate absorption service. Raw untreated water flows through the beds which are selected by the control system to be in the adsorb mode of operation.

The absorb cycle continues until a bed has reached its operator selected absorption capacity or when a new bed needs to be brought online to maintain even staggering of the beds. Absorption capacity can be selected based on knowledge of the beds breakthrough curve characteristics established through computer modeling and then proven through testing at the initial startup of the unit. Alternatively, absorption capacity can be determined analytically by monitoring the effluent from individual beds and noting when the perchlorate level in the effluent has broken through.

Beds are sequenced such that just as a bed needs to be removed from service, a reloaded bed has had new resin installed and is ready to come online into absorb.

Absolute absorption capacity of a bed is defined by the total amount of raw water that can flow through the bed before breakthrough occurs. The operator selected absorption capacity is selected at a point on the curve, which will yield the desired combined effluent quality. When a bed reaches the operator selected absorption capacity, it is taken offline and waits for fresh resin to be loaded.

Resin replacement takes place after a desired number of beds have reached their absorption capacity. At this point the necessary equipment to load and unload the resin (resin replacement truck) will be brought on site and connected to the vessels.

To remove the spent resin two hoses will be brought in from the resin replacement truck. The suction line will be connected to connection port on the bottom of the bed. This line will suction the resin out. The second line is a slurry return line and will be connected to the port at the top of the bed. This now creates the path to slurry the resin out of the bed. Once the equipment on the resin replacement truck is ready valves will be opened and the resin removal process will continue until all resin is removed from the bed. Once this is complete the valves will be closed and the hoses will be removed.

After all resin has been removed from the bed fresh resin will be loaded into the bed. To load fresh resin two hoses will be brought in from the resin replacement truck. The first line will be connected to the connection port on the top of the bed. These lines will slurry in fresh resin the truck. The second line is a slurry return line and will connect to the port on the bottom of the bed. This bottom port has a strainer internal to the bed and will not allow any of the fresh resin to slurry out during the resin loading process. Once the equipment on the resin replacement truck is a ready valves will be opened until the bed is loaded with fresh resin. Once this is complete valves will be closed and the hoses will be removed. (It will be appreciated that in view of the generally small size of the vessels, resin replacement could be carried out by physically removing the entire vessel with its contaminated resin and inserting a new vessel filled with fresh resin. This approach could be used is there were concerns about handling the spent resin.)

At this point the bed is now ready to come back online once the system is ready for it.

The replaceable resin beds have a resin life of approximately 75,000 bed volumes. This corresponds to 120 days of continuous operation for each bed if flowing at the expected capacity for this facility (800 gpm). The anion breakthrough curve in FIG. 4 of the Treatment Unit Design Information section shows the model analysis for a single bed. It is important to remember that all beds are equally staggered and will have a total plant effluent made up of the combined effluent of each bed.

The perchlorate removal beds are operated in a parallel equal flow distribution configuration. The beds are equally staggered and only one bed is close to breakthrough at any time. This means that even if perchlorate began to leak out of the highest bed, it only constitutes one tenth of the total plant flow and has a limited effect on combined effluent perchlorate levels.

What is claimed is:

1. A method for removing perchlorate ion contamination from a perchlorate-ion-contaminated water stream comprising:
   a. obtaining a plurality of at least 6 vessels each substantially filled with a bed of an ion exchange resin having affinity for perchlorate ions,
   b. feeding said perchlorate-contaminated water stream over the resin in a substantial proportion but not all of the plurality of vessels, said substantial proportion of vessels operating in parallel to one another thereby removing perchlorate ion from the water stream and generating reduced perchlorate content product water streams and loading the resin beds in the substantial proportion of the plurality of vessels with perchlorate ions,
   c. periodically removing from service a subset of the vessels employed in step b, said subset of vessels containing resin that has been loaded with perchlorate in step b and replacing this subset with a similar subset of vessels taken from those vessels obtained in step a, but not employed in step b,
   d. either replacing in the plurality of vessels those vessels removed from service in step c with an equivalent number of equivalent replacement vessels having fresh ion exchange resin or replacing the ion exchange resin in those vessels removed from service in step c with fresh replacement ion exchange resin and returning the vessels with the fresh replacement ion exchange resin into the plurality of vessels,
   e. disposing to the perchlorate-loaded resin present in those vessels removed from service in step c, and
   f. continuing step b while periodically repeating steps c and d at least until all of the plurality of vessels have either been replaced or had their resin replaced.

2. The method of claim 1 wherein the periodic removing from service of vessels is carried out on a predetermined schedule.

3. The method of claim 1 wherein the perchlorate content of the reduced perchlorate content product water stream is monitored and the removing from service of vessels in step c is based upon the results of the monitoring.

4. The method of claim 1 wherein the plurality of vessels is from about 6 vessels to about 30 vessels.

5. The method of claim 4 wherein the plurality of vessels is from about 10 to about 30 vessels.

6. The method of claim 5 wherein the substantial proportion of the plurality of vessels is such that no single vessel is being fed more than about 20% or the total amount of perchlorate ion-contaminated water.

7. The method of claim 1 wherein in step c the vessels removed from service are replaced with a substantially equivalent number of equivalent vessels having fresh ion exchange resin.

8. The method of claim 1 wherein in step c the vessels removed from service have their ion exchange resin replaced with fresh ion exchange resin.

9. The method of claim 1 wherein the ion exchange resin is a disposable ion exchange resin.

10. The method of claim 9 wherein the disposable ion exchange resin is a polystyrene-based ion exchange resin.

11. The method of claim 1 wherein the streams of reduced perchlorate content product water are pooled.

12. The method of claim 11 wherein the poled product water is passed over a polishing bed of ion exchange resin.

13. The method of claim 1 wherein the perchlorate ion-contaminated feed water is passed through a pretreatment step before being contacted with the resin beds.

14. The method of claim 1 wherein the perchlorate-contaminated water stream is ground water.

15. The method of claim 1 wherein the perchlorate-contaminated water stream is drinking water.

16. The method of claim 1 wherein the perchlorate-contaminated water stream is a brine.

17. A system for removing perchlorate ion from perchlorate ion-contaminated water stream comprising:
   a plurality of at least 6 vessels each substantially filled with a bed of an ion exchange resin having affinity for perchlorate ions,
   means for feeding said perchlorate-contaminated water over the bed of ion exchange resin in a substantial proportion but not all of the plurality of vessels, said substantial proportion of vessels operating in parallel to one another thereby removing perchlorate ion from the perchorate-contamianted water stream and generating reduced perchlorate content product water streams and loading the resin beds in the substantial proportion of the plurality of vessels with perchlorate ions,
   means for periodically removing from service a subset of the substantial proportion of the plurality of vessels containing resin that has been loaded with perchlorate and replacing this subset with a similar subset of vessels taken from those vessels not already employed removing perchlorate,
   means for replacing the vessels removed from service in the plurality of vessels with a substantially equivalent number of equivalent vessels having fresh ion exchange resin or
   means for replacing the ion exchange resin in the vessels removed from service with fresh resin and returning the vessels with the replaced resin into the plurality of vessels,
   means for thereafter continuing the feeding while periodically repeating the removing and replacing at least until all of the substantial plurality of vessels have been removed and replaced, and means for disposing of perchlorate loaded resin present in the vessels removed from service.

* * * * *